May 29, 1923. 1,457,218
A. I. DU PONT ET AL
METHOD OF AND APPARATUS FOR AUTOMATICALLY CLEANING, SCALDING, AND
PEELING FRUIT
Filed Jan. 24, 1922 3 Sheets-Sheet 1
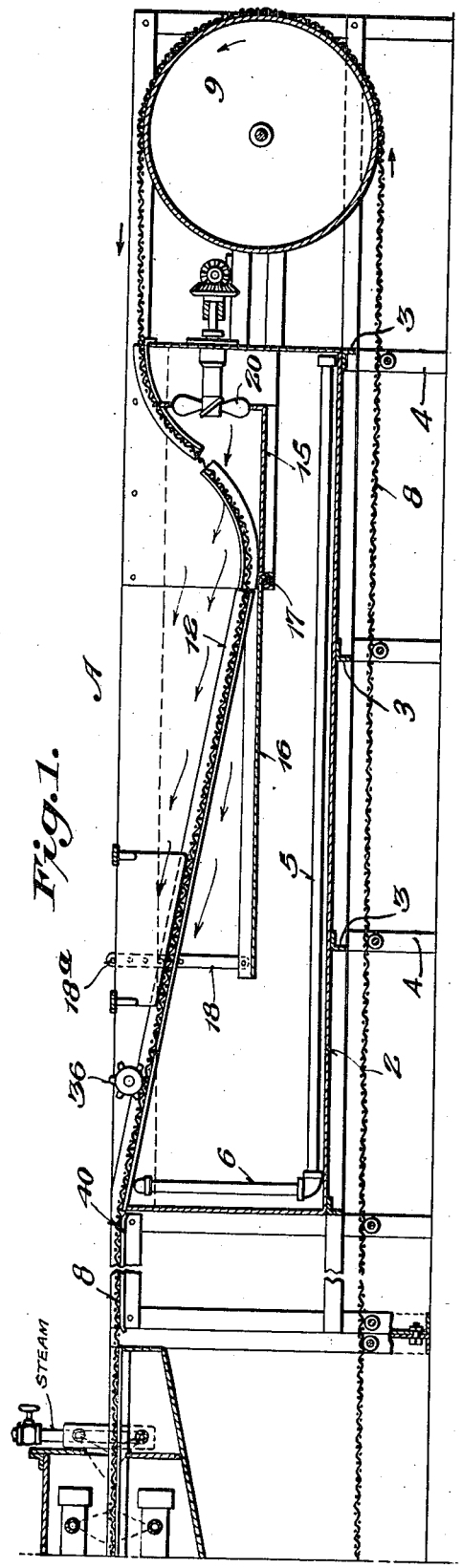
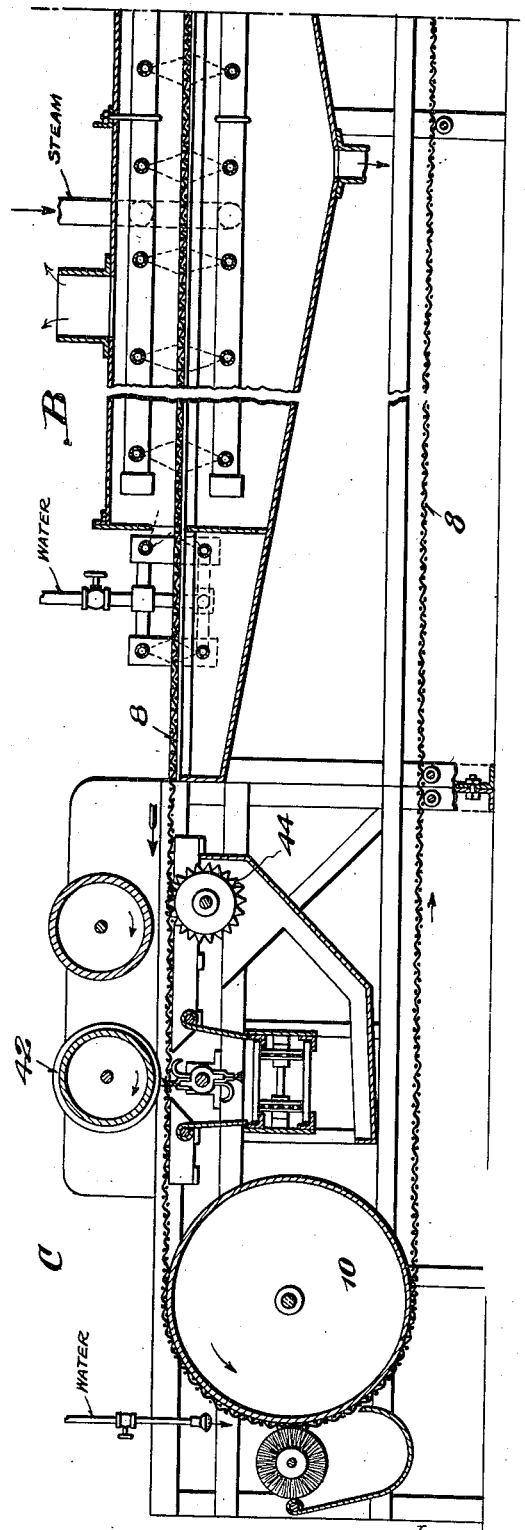
INVENTORS
Alfred I. DuPont,
Hiram R. Harding,
By Eugene C. Brown

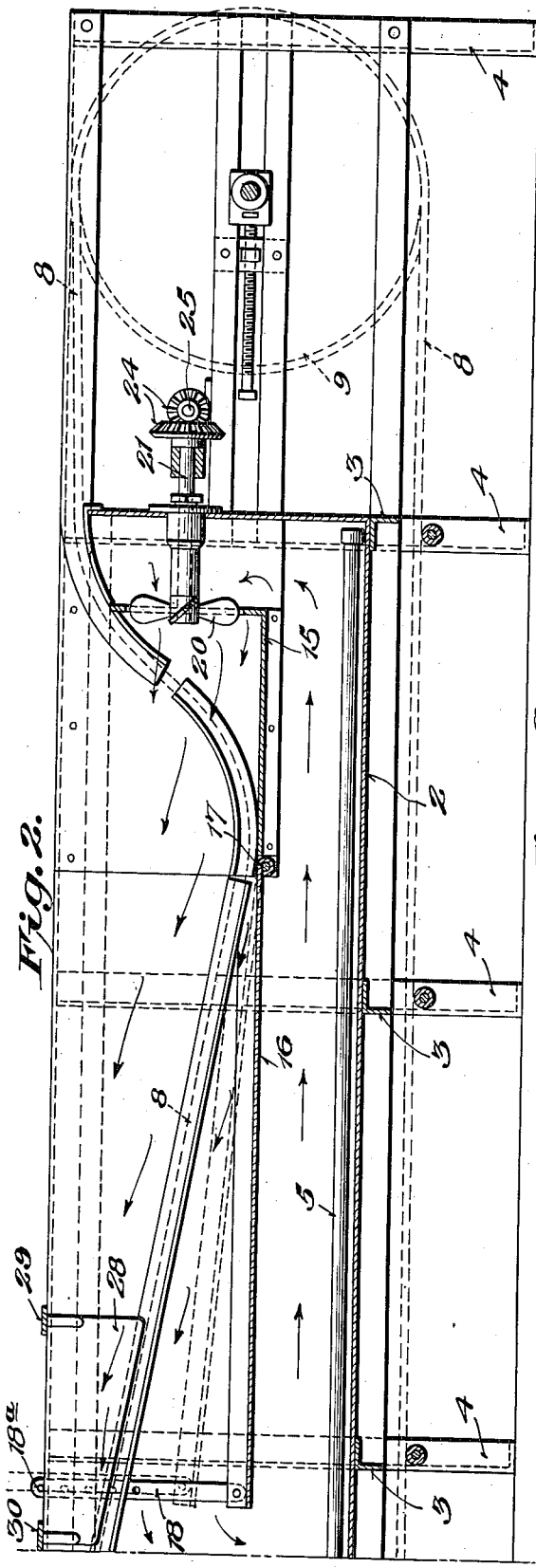

May 29, 1923.
A. I. DU PONT ET AL
1,457,218
METHOD OF AND APPARATUS FOR AUTOMATICALLY CLEANING, SCALDING, AND PEELING FRUIT
Filed Jan. 24, 1922
3 Sheets-Sheet 3
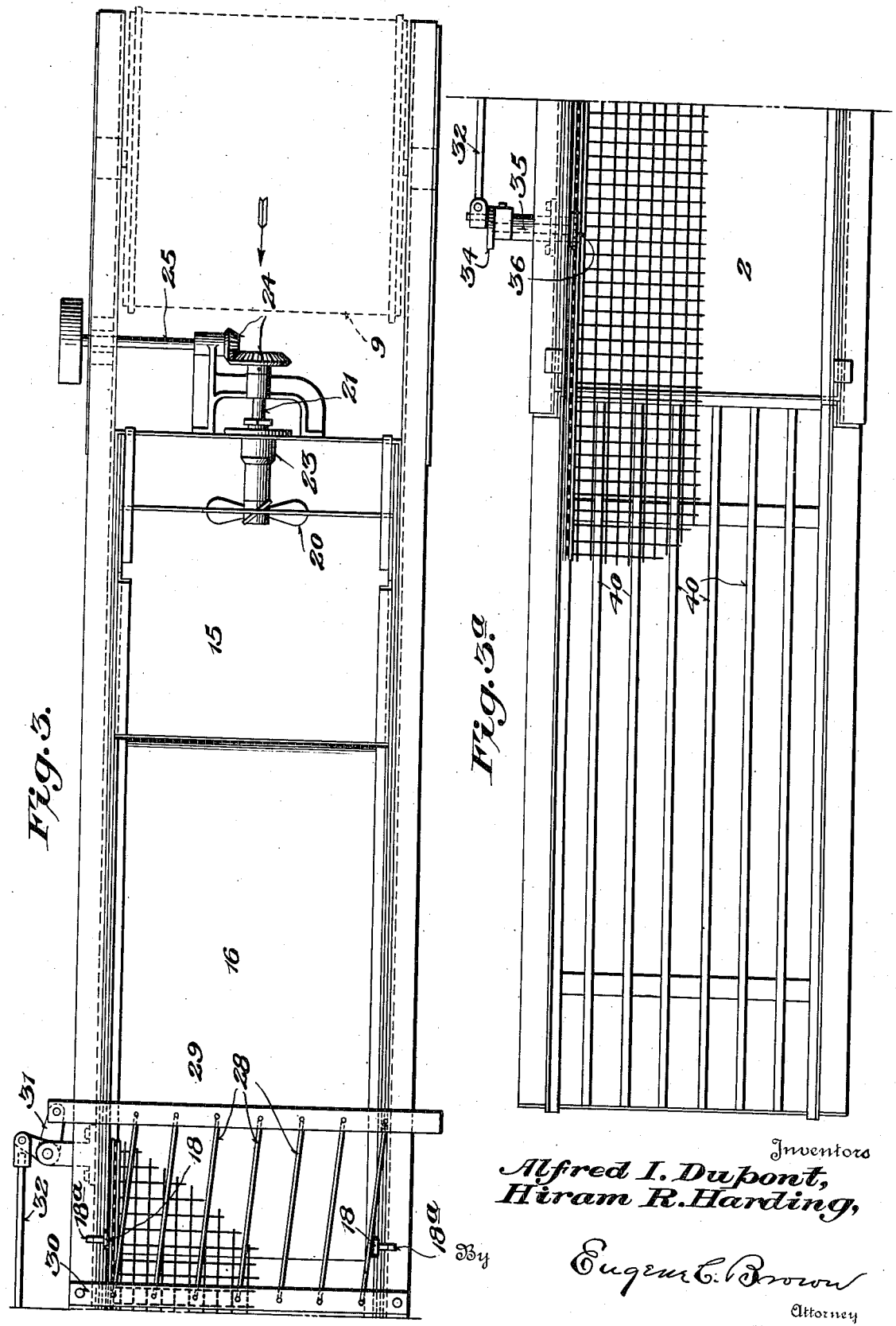
Inventors
Alfred I. Dupont,
Hiram R. Harding,
By Eugene C. Brown
Attorney Patented May 29, 1923.

1,457,218

UNITED STATES PATENT OFFICE.

ALFRED I. DU PONT, OF WILMINGTON, DELAWARE, AND HIRAM R. HARDING, OF BALTIMORE, MARYLAND, ASSIGNORS TO THE HARDING PEELING MACHINE COMPANY, OF WILMINGTON, DELAWARE, A CORPORATION OF DELAWARE.

METHOD OF AND APPARATUS FOR AUTOMATICALLY CLEANING, SCALDING, AND PEELING FRUIT.

Application filed January 24, 1922. Serial No. 531,498.

*To all whom it may concern:*

Be it known that we, ALFRED I. DU PONT, residing at Wilmington, county of New Castle, State of Delaware, and HIRAM R. HARDING, residing at Baltimore, county of Baltimore City, State of Maryland, citizens of the United States, have invented certain new and useful Improvements in Methods of and Apparatus for Automatically Cleaning, Scalding, and Peeling Fruit, of which the following is a specification.

Our invention pertains especially to machines for removing the skin and core of tomatoes and slicing them preparatory to the canning operation. The present improvements are directed particularly to the initial washing and scalding of the fruit and feeding it upon a conveyor which carries it through the several operations of the machine.

Heretofore the fruit has been placed one by one upon the conveyor belt by the hands of operators. This method is not only slow and expensive but necessarily more or less insanitary. Our invention eliminates the handling of the fruit by operatives and not only effects a thorough washing while the fruit is being subjected to a scalding operation, but it also automatically places each tomato in a predetermined aligned position upon the conveyor belt with the core uppermost. The method of operation and structure of the apparatus will be understood from the following description in connection with the accompanying drawings, in which—

Figures 1 and 1ª show a longitudinal sectional view of a tomato peeling and coring machine embodying our invention; Figs. 2 and 2ª show a longitudinal view of the automatic washing scalding and feeding apparatus; and Figs. 3 and 3ª show a top plan view of the same.

In Figs. 1 and 1ª, A designates the washing and feeding apparatus which is claimed in the present case; B illustrates the steam scalder forming the subject-matter of our application, Serial No. 531,740 filed Jan. 25, 1922; and C shows the coring and peeling apparatus covered by my prior patent No. 1,423,421, dated July 18, 1922.

The washing, scalding and automatic feeding apparatus comprises a vat or tank 2, supported upon cross-bars 3, extending between the uprights or standards 4 of the frame. The water is heated by a perforated pipe 5 connected by a pipe 6 with a source of steam supply. The continuous wire conveyor 8 which extends from one end of the machine to the other, passing over end drums 9, 10 is caused to dip suddenly into the forward end of the tank and then rise gradually to the discharge end of the tank, the side chains of the belt being guided in the lateral channel-iron guides 12.

The main portion of the tank is divided by a horizontal diaphragm having a stationary portion 15 and a vertically adjustable portion 16, pivoted at 17 to the stationary portion. The free end of the swinging or vertically adjustable portion is carried by links 18 which are provided with a series of holes to receive pins 18ª. The water is caused to circulate in opposite directions above and below the diaphragm, as indicated by arrows, by means of a propeller wheel 20, or in any other suitable manner. The shaft 21 of the propeller passes through a stuffing box 23, and is driven through gears 24 from a power shaft 25.

The specific gravity of a tomato is less than that of water and consequently it will float. Moreover a ripe tomato is heavier than a green one and the ripened portion than the green portion. Inasmuch as a tomato which is ripened in the field always has a green portion about the stem it is evident that a tomato will always float with the stem uppermost. We have devised a feeding apparatus which utilizes this property.

When the tomatoes are dumped into the vat or tank, they are agitated by the currents produced by the propeller and those at the top rise to the surface with the stem uppermost, and are carried by the current in the direction of the arrows. As they approach the discharge end they enter one by one into the channels or spaces between a series of parallel blades 28 pivoted at their forward ends to an oscillatory bar 29 and at their rear ends to a stationary bar 30. The oscillation of the bar 29 is effected by a bellcrank 31, connected by a link 32 with an eccentric 34 carried on the end of a shaft 35 which is provided on its inner end with a gear or cog wheel 36, adapted to engage the sprocket chain upon the adjacent side of the conveyor belt. As the blades 28 are moved to and fro by the oscillating bar 29, the tomatoes are washed and emerge from the discharge end thoroughly cleansed. The depth of water over the conveyor belt diminishes gradually until the belt emerges from the water at the rear end of the blades. The tomatoes, therefore, float into the spaces or channels between the blades and are lifted onto the belt, stems uppermost, as they emerge from between the blades. The blades are so positioned that the middle of each space is in alinement with one of the guide or gauge bars 40 of the feed table. These gauge bars are in alinement with the grooves in the pressing rolls 42 of the coring and peeling apparatus C, which force the meat of the tomatoes through the meshes of the belt while the skins and cores remain thereon.

It is desirable that the tomatoes should be moving at the same speed as the conveyor belt at the instant they seat over the meshes of the belt in order that they may remain in proper position with the stems uppermost. To affect this, of course, the diaphragm 16 is raised or lowered by changing the position of the pegs 18ª in the links 18, thereby varying the cross-section of the water flowing over the discharge end of the diaphragm until the speed of the water currents corresponds with the speed of the belt. In this manner, the movement of the tomatoes may be very accurately discharged to correspond with the movement of the belt at the instant they are carried forward thereon.

The operation of this apparatus will be understood from the previous description of the construction of the several structural parts. The tomatoes are discharged into the vat or tank A which is heated to a scalding temperature by the steam supplied through the pipes 5 and 6. The swinging diaphragm 16 having been adjusted to the proper angle, the propeller 20 causes the water to circulate in opposite directions above and below the diaphragm, the adjustment of the latter causing the currents to flow over the free end of the diaphragm with a velocity corresponding to the speed of the conveyor belt. The tomatoes rise to the surface with their stems uppermost by reason of the greater specific gravity of the ripened portions and they are then carried by the currents into the spaces or channels between the pivoted blades 28. As these blades oscillate, the tomatoes are moved laterally to and fro so that by the time they emerge from the rear ends of the passages, they have been thoroughly washed. Inasmuch as the tomatoes are at this moment moving at the same rate as the conveyor belt, they are taken up by the latter without jar in the desired position with stems uppermost. As previously stated, the pivoted ends of the blades 28 are so positioned that the tomatoes emerge from the passages therebetween in alignment with the gauge bars 40, so that each tomato is centered over a mesh of the conveyor belt and in alignment with the rotary slicing cutters 44 and the grooves of the pressing coring rolls 42.

We have illustrated a propeller as the means for causing the circulation of the water in the tank but it is evident that a pump or other means may be employed. Likewise various other changes may be made in the several parts of the mechanism shown and described for the purpose of affecting the results accomplished by our invention without in any manner departing therefrom.

We claim:—

1. The method of preparing fruit such as tomatoes, for a peeling and coring operation, which consists in immersing the fruit in a water bath, creating a current in the upper portion thereof to cause a definite movement of the fruit adjacent the surface of the water, separating the moving fruit into parallel channels and conveying it in a continuous succession in spaced alinement.

2. The method of preparing fruit such as tomatoes, for a peeling and coring operation, which consists in immersing the fruit in a water bath, heating the bath to a scalding temperature, creating a current in the upper portion thereof to cause a definite movement of the fruit adjacent the surface of the water, separating the moving fruit into parallel channels agitating the individual fruit bodies by an oscillatory motion, and conveying it in a continuous succession in spaced alinement.

3. Apparatus for automatically preparing tomatoes or other fruit for a peeling and coring operation, comprising a washing tank into which the tomatoes are discharged, a conveyor belt movable obliquely upward through the tank and means for directing the tomatoes in parallel aligned rows upon the belt as it emerges from the water.

4. In an apparatus as set forth in claim 3, means for causing a current in the water adjacent the surface in the direction of the movement of the belt.

5. Apparatus for automatically preparing tomatoes or other fruit for a peeling and coring operation, comprising a washing tank into which the tomatoes are discharged, a conveyor belt movable obliquely upward through the tank, means for causing a current in the water adjacent the surface in the direction of the movement of the belt, means for washing the tomatoes by an oscillatory movement, and means for directing them in parallel aligned rows upon the belt as it emerges from the water.

6. In an apparatus as set forth in claim 5, a transverse diaphragm within the tank and means for adjusting it to different positions to vary the rate of flow of said surface currents.

In testimony whereof we affix our signatures.

ALFRED I. Du PONT.
HIRAM R. HARDING.